United States Patent [19]

Takagi

[11] Patent Number: 4,488,804
[45] Date of Patent: Dec. 18, 1984

[54] METHOD AND MACHINE FOR AUTOMATIC FOCUSING IN A PROJECTION SYSTEM WITH CONTINUOUSLY VARIABLE MAGNIFICATION

[75] Inventor: Tsuneo Takagi, Kurita, Japan

[73] Assignee: Dainippon Screen Seizo Kabushiki Kaisha, Kyoto, Japan

[21] Appl. No.: 454,583

[22] Filed: Dec. 30, 1982

Related U.S. Application Data

[63] Continuation of Ser. No. 230,396, Feb. 2, 1981, abandoned.

[30] Foreign Application Priority Data

Feb. 25, 1980 [JP] Japan ................................ 55-21590

[51] Int. Cl.³ ...................... G03B 27/34; G03B 27/40
[52] U.S. Cl. ..................................................... 355/56
[58] Field of Search ..................................... 355/56, 57

[56] References Cited

U.S. PATENT DOCUMENTS

| | | | |
|---|---|---|---|
| 2,655,834 | 10/1953 | Pennington | 355/56 |
| 3,832,058 | 8/1974 | Gusovius | 355/56 |
| 4,021,115 | 5/1977 | Jeppesen | 355/56 |
| 4,253,763 | 3/1981 | Schleifenbaum | 355/57 |

*Primary Examiner*—Monroe H. Hayes
*Attorney, Agent, or Firm*—Yuter, Rosen & Dainow

[57] ABSTRACT

A method and machine for automatic focusing in a projection system with continuously variable magnification, wherein an original picture is projected onto a photosensitive material by a focusing lens, wherein one of these three members is fixed and the other two members are moved in a direction of a light axis by moving means, wherein the positions of the two moving members are detected by detectors, and wherein control means controls that, when the magnification of a picture image is changed, one moving member having a larger moving rate than that of the other moving member is moved ahead of the other moving member and the other moving member is moved dependent on the one moving member so that the picture image projected may constantly be focused onto the photosensitive material.

17 Claims, 4 Drawing Figures

METHOD AND MACHINE FOR AUTOMATIC FOCUSING IN A PROJECTION SYSTEM WITH CONTINUOUSLY VARIABLE MAGNIFICATION

This is a continuation of application Ser. No. 230,396, filed Feb. 2, 1981, now abandoned.

BACKGROUND OF THE INVENTION

This invention relates to a method and machine for automatic focusing in a projection system with continuously variable magnification.

In a process camera or an enlarger for photographing a picture image projected onto a photosensitive material by using a focusing lens, or a projection system such as a projector, or the like, for projecting an enlarged picture image onto a screen, an automatic focusing projection system with continuously variable magnification has been often employed so that a trimming of an original picture may readily be performed and so that it may be observed whether the magnification scale is being increased or reduced when the magnification scale is varied.

In one conventional automatic focusing projection system, while a photosensitive material is fixed, the focusing lens and the original picture are moved together by using cams. In this case, the manufacture of the cams is rather troublesome and thus requires high cost. Further, when the focusing lens is replaced with another one having a different focal distance, different cams are required and it is rather troublesome to adjust the focusing of the new lens.

SUMMARY OF THE INVENTION

Therefore, it is an object of the present invention to provide a method for automatic focusing in a projection system with continuously variable magnification free from the aforementioned inconveniences, which is carried out in a quick, simple, stable and accurate operation.

It is further object of the present invention to provide a machine for automatic focusing in a projection system with continuously variable magnification free from the aforementioned inconveniences, which does not use any cams, and which is simple in construction, and is capable of performing a quick, stable and accurate focusing.

According to the present invention there is provided a methof for automatic focusing in a projection system with continuously variable magnification, wherein an original picture is projected onto a photosensitive material by a focusing lens, and wherein one of these three members is fixed and the other two members are adapted to be moved in a direction of a light axis, the improvement wherein, when the magnification of a picture image is changed, one moving member having a larger moving rate than that of the other moving member is moved ahead of the other moving member and the other moving member is moved dependent on the one moving member so that the picture image projected may constantly be focused onto the photosensitive material.

According to the present invention there is also provided a machine for automatic focusing in a projection system with continuously variable magnification, wherein an original picture is projected onto a photosensitive material by a focusing lens, and wherein one of these three members is fixed and the other two members are adapted to be moved in a direction of a light axis, comprising (a) means for moving two moving members, (b) detectors for detecting positions of the two moving members, and (c) control means which calculates positions of the two moving members corresponding to the desired magnification when the magnification is changed, which moves the one moving member having a larger moving rate than that of the other moving member ahead of the other moving member, and which calculates a goal position to which the other moving member is to be moved, corresponding to the position of the one moving member, and moves the other moving member to the goal position dependent on the movement of the one moving member so that the picture image projected may constantly be focused onto the photosensitive material.

BRIEF DESCRIPTION OF DRAWINGS

In order that the present invention may be better understood, preferred embodiments thereof will be described with reference to the accompanying drawings, in which.

DESCRIPTION OF PREFERRED EMBODIMENTS

Figure 1:
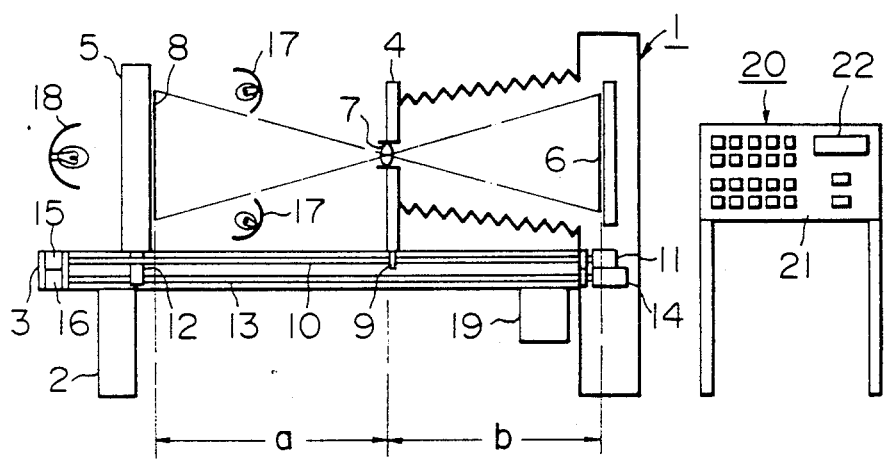
FIG. 1 is a side view of a process camera to which the present invention is applied.

Referring now to the drawings there is shown in FIG. 1 a process camera to which a method for automatic focusing in a projection system with continuously variable magnification according to the present invention is applied.

A film holder 1 and legs 2 support a frame 3 horizontally. A lens holder 4 and a picture holder 5 are movably mounted to the frame 3 toward or away from the film holder 1. A photosensitive film 6, a focusing lens 7 and an original picture 8 are mounted to the film holder 1, the lens holder 4 and the picture holder 5, respectively.

A nut 9 mounted to the lower end of the lens holder 4 is engaged with a screw rod 10 which is mounted to the frame 3 and extends in a longitudinal direction of a light axis of the lens 7. One end (right hand side of FIG. 1) of the screw rod 10 is connected to a motor 11 for driving the lens holder 4 along the frame 3, which is arranged in the film holder 1.

Another nut 12 mounted to the lower end of the picture holder 5 is engaged with another screw rod 13 which is mounted to the frame 3 under and in parallel with the screw rod 10 and extends in the direction of the light axis of the lens 7. One end (right hand side of FIG. 1) of the screw rod 13 is connected to another motor 14 for driving the picture holder 5 along the frame 3, which is also arranged in the film holder 1.

At the other ends (left hand side in FIG. 1) of the screw rods 10 and 13 position detectors 15 and 16 such as a rotary encoder are mounted. The position detectors 15 and 16 detect the positions of the lens holder 4 and the picture holder 5 depending on the rotation numbers and rotation angles of the screw rods 10 and 13, and output position signals. The lens holder 4 and the picture holder 5 are moved at the same speed along the frame 3 by the motors 11 and 14.

Light sources 17 for photographing the light reflected from the original picture 8 and a light source 18 for photographing the light passed through the original picture 8 are arranged near the picture holder 5. A motor drive unit 19 for the motors 11 and 14 is mounted to the frame 3. A control means 20 with an operation board 21 and a digital display means 22 for controlling the motor drive unit 19 and the process camera of FIG. 1 electronically is arranged beside the film holder 1.

In this embodiment described above, assuming that the focal distance of the lens 7, the distances between the lens 7 and the original picture 8 and between the lens 7 and the film 6, and the projection magnification are f, a, b and m, the relation among these symbols is expressed as follows:

$$1/a + 1/b = 1/f \text{ and } m = b/a$$

In an automatic focusing projection system with continuously variable magnification, when the projection magnification m is varied, the above equations are satisfied, and from the above equations the following equations are obtained:

$$a = f(1 + 1/m) \quad \text{(A)}$$

$$b = f(1 + m) \quad \text{(B)}$$

$$a + b = f(m + 1/m + 2) \quad \text{(C)}$$

Figure 2:
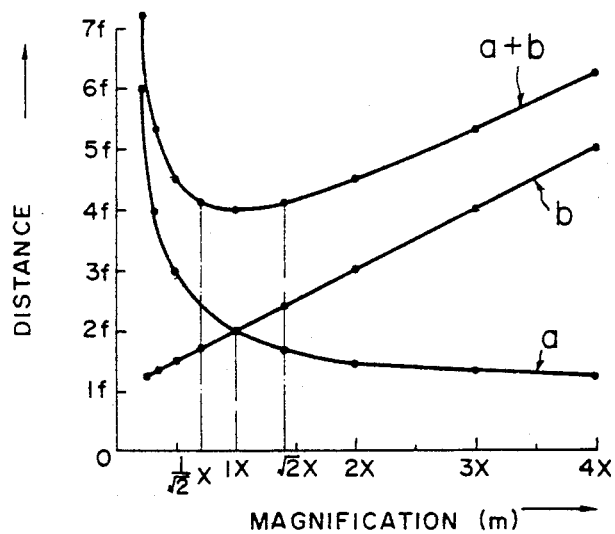
FIG. 2 is a graph which shows distance variations between a photosensitive film holder and a lens holder, and the photosensitive film holder and a picture holder with respect to projection magnifications.

The values a, b and a+b obtained with respect to the variations of m according to the equations B and C are shown in FIG. 2. From FIG. 2 it is understood that the moving rate of the lens holder 4 is nearly larger than that of the picture holder 5 in the enlarging projection and vice versa in the reducing projection, as hereinafter described.

The moving rate of the lens holder 4, i.e. the slope of the line of b shown in FIG. 2 is obtained by differentiating the equation B with respect to m as follows:

$$(db)/(dm) = f$$

Then, the moving rate of the picture holder 5, i.e. the slope of the line of a+b shown in FIG. 2 is obtained by differentiating the equation C with respect to m in the following equation:

$$f \left| \frac{m^2 - 1}{m^2} \right| = f, \text{ and therefore } \frac{1 - m^2}{m^2} = 1$$

Only in this case, an actual solution is exist. This equation is solved with respect to m, thereby obtaining the following:

$$m = \frac{1}{\sqrt{2}}$$

This means that, when the projection magnification m is larger than $1/\sqrt{2}$, the moving rate of the lens holder 4 is larger than that of the picture holder 5, and when the projection magnification m is smaller than $1/\sqrt{2}$, the moving rate of the lens holder 4 is smaller than that of the picture holder 5.

Accordingly, the process camera shown in FIG. 1 is adapted to be controlled electronically so that, when the projection magnification m is larger than $1/\sqrt{2}$, the picture holder 5 may be moved dependent on the movement of the lens holder 4, and when the projection magnification m is smaller than $1/\sqrt{2}$, the lens holder 4 may be moved dependent on the movement of the picture holder 5, with the result of automatic focusing of the picture image onto the photosensitive film 6 with continuously variable magnification. When the projection magnification m is $1/\sqrt{2}$, either lens holder 4 or picture holder 5 can be moved dependent on the movement of the picture holder 5 or the lens holder 4. This control method will be described in detail in the followings.

Figure 3:
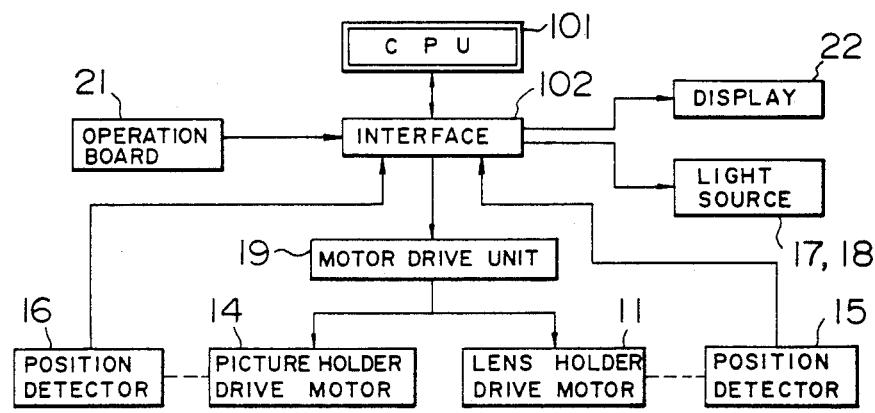
FIG. 3 is a block diagram of a control circuit for the process camera of FIG. 1.

In FIG. 3 there is shown a control circuit for controlling the process camera of FIG. 1, which is included in the control means 20. The operation board 21, the digital display means 22, the light sources 17 and 18, the motor drive unit 19 to which the motors 11 and 14 are connected, and the position detectors 15 and 16 are coupled to a central processing unit 101, hereinafter referred to as CPU, via an interface 102.

Figure 4:
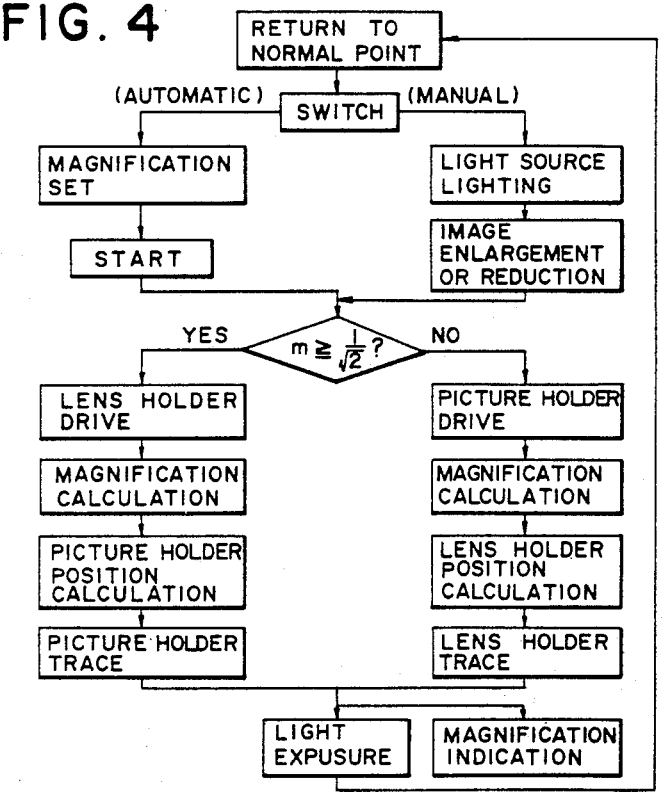
FIG. 4 is a flow chart for operating the process camera of FIG. 1.

In FIG. 4 is shown a flow chart for operating the process camera of FIG. 1. The operation of the process camera will be described in connection with FIGS. 3 and 4.

A power switch of the operation board 21 is switched on to return the lens holder 4 and the picture holder 5 to a normal point or a starting point which is may be set, for example, to a point of one end of the frame 3.

First, when the projection magnification m is predetermined, the operation is carried out as follows.

The process camera is set to "automatic" by a switch of the board 21, and the projection magnification m is set by a digital switch. Then, the control means 20 is started.

Then, the motor drive unit 19 is actuated, and the lens holder 4 and the picture holder 5 are driven by the motors 11 and 14 so that the original picture 8 may be projected onto the film 6 with the predetermined magnification m.

In this embodiment, when the magnification m is larger than $1/\sqrt{2}$, the lens holder 4 is moved ahead of the picture holder 5, and the picture holder 5 is moved dependent on the lens holder 4. While the lens holder 4 is moved, the position detector 15 detects the position of the lens holder 4 and sends its information to the CPU 101. Then, the CPU 101 calculates continuously the magnification m corresponding to the position detected of the moving lens holder 4 and a goal position to which the picture holder 5 is to be positioned, which corresponds to the magnification, according to the equations B and C.

When the goal position is different from the actual position of the picture holder 5, which is detected by the position detector 16 at the same time as the detector 15, the picture holder 5 is moved so as to remove this difference.

Since, when the magnification m is larger than $1/\sqrt{2}$, the moving rate of the picture holder 5 is smaller than that of the lens holder 4, and the picture holder 5 and the lens holder 4 are moved at the same speed, the picture holder 5 can substantially trace or follow up the goal position at a moment, and accordingly the picture image projected is constantly focused on the film 6 when the magnification m is being varied. In brief when the first and the second moving members are moved by the first and the second drive units of the same moving speed respectively, if the moving ratio (amount) which will be the goal of the second moving member is smaller than that which is the goal position of the first moving member, the second moving member can follow up to the corresponding goal position at each moment during moving operation.

When the lens holder 4 and the picture holder 5 have reached the goal positions corresponding to the settled magnification m, they are stopped. The projection magnification m at this time is displayed on the display means 22, and the light sources 17 and 18 are switched on so as to photograph the picture.

When the projection magnification m predetermined is smaller than $1/\sqrt{2}$, the picture holder 5 is moved ahead of the lens holder 4 which is moved dependent on the picture holder 5. In this embodiment, the picture holder 5 and the lens holder 4 are moved with automatic focusing of the picture image onto the film 6 in the same manner as described above.

Second, when the projection magnification m is not determined and is to be determined by the trimming of the picture 8, the operation is performed as follows.

The process camera is set to "manual" by the switch of the board 21 and the light sources 17 and 18 are switched on.

Then, while observing the picture image projected on the focusing glass, the lens holder 4 and the picture holder 5 are moved manually by enlarging or reducing the picture image by operating push buttons of the operation board 21. On this occasion, the picture image is automatically focused on the film 6, as described above, and the projection magnification m is displayed on the display means 22. When the desired picture image is obtained, the lens holder 4 and the picture holder 5 are stopped so as to photograph the picture image projected on the film 6.

In this embodiment, the relation of the moving-ahead and the dependence between the lens holder 4 and the picture holder 5 are changed at a moment by the CPU 101 when the magnification m is $1/\sqrt{2}$, in the same manner as described above. When the magnification is varied continuously, there is no need to return the lens holder 4 and the picture holder 5 to the normal point except that the power switch is switched on.

When the focusing lens 7 is replaced by another one, its focal distance is input to the CPU 101, and then the CPU 101 controls the operation automatically.

In this embodiment described above, although the film holder 1 is fixed and the lens holder 4 and the picture holder 5 are moved, however, according to the present invention, of course, either lens holder 4 or picture holder 5 may be fixed and the other two holders may moved.

When the picture holder 5 is fixed, the calculations are carried out with respect to a and a+b in the same manner as described above. In this case, the relation of the moving-ahead and the dependence between the film holder 1 and the lens holder 4 are changed when the magnification m is $1/\sqrt{2}$. That is, when the magnification m is larger than $1/\sqrt{2}$, the film holder 1 is moved ahead of the lens holder 4 which is moved dependent on the film holder 1, and vice versa.

When the lens holder 4 is fixed, the calculations are performed with respect to a and b in the same manner as described above, and the relation of the moving-ahead and the dependence between the film holder 1 and the picture holder 5 are changed when the magnification m is one. That is, when the magnification m is larger than one, the film holder 1 is moved ahead of the picture holder 5 which is moved dependent on the film holder 1, and vice versa.

Although the present invention has been described in terms of the preferred embodiments thereof, however, various changes and modifications can be made by those skilled in the art without departing from the scope of the present invention.

What is claimed is:

1. A method for automatic focusing in a projection system with continuously variable magnification, wherein an original picture is projected onto a photosensitive material by a focusing lens, and wherein one of these three members, the original picture, the focusing lens and the photosensitive material, is fixed and the other two, first and second members, are adapted to be moved in a direction of a light axis, the improvement wherein, said system operates in a first magnification range and second magnification range and when the required magnification of a picture image is changed in the first range, said first member, having a larger distance to move than that of said second member, commences movement before said second member commences movement, and said second member is moved to goal positions dependent on the instantaneous position of said first member, said second member following substantially instantly to said goal positions including the position of said required magnification, the projected picture image being substantially constantly focused onto the photosensitive material, and when the required magnification of a picture image is changed in the second range, said second member, having a larger distance to move than that of said first member, commences movement before said first member commences movement, and said first member is moved to goal positions dependent on the instantaneous position of said second member, said first member following substantially instantly to said goal positions including the position of said required magnification, the projected picture image being substantially constantly focused onto the photosensitive material.

2. A method as defined in claim 1, wherein the photosensitive material is fixed relative to said first and second members, and wherein, when the magnification is at least $1/\sqrt{2}$, the focusing lens commences movement before the original picture moves and the original picture is moved dependent on the instantaneous position of the focusing lens, and when the magnification is smaller than $1/\sqrt{2}$, the original picture commences movement before the focusing lens moves and the focusing lens is moved dependent on the instantaneous position of the original picture, the member which follows in motion when magnification is changed following substantially instantly to reach said goal positions including the position of said required magnificaiton.

3. A method as defined in claim 1, wherein the original picture is fixed relative to said first and second members, and wherein, when the magnification is at least $\sqrt{2}$, the photosensitive material, the first member, is moved before the focusing lens, the second member, moves and the focusing lens is moved dependent on the instantaneous position of the photosensitive material, and when the magnification is smaller than $\sqrt{2}$, the focusing lens is moved before the photosensitive material moves and the photosensitive material is moved dependent on the instantaneous position of the focusing lens, the member which follows in motion when magnification is changed following substantially instantaneously to reach said goal positions including the position of said required magnification.

4. A method as defined in claim 1, wherein the focusing lens is fixed relative to said first and second members, and wherein, when the magnification is at least one, the photosensitive material, the first member, is moved before the original picture, the second member, moves and the original picture is moved dependent on the instantaneous position of the photosensitive material, and when the magnification is smaller than one, the original picture is moved before the photosensitive material moves and the photosensitive material is moved dependent on the instantaneous position of the original picture, the member which follows in motion when magnification is changed following substantially instantaneously to its goal positions including the position of the required magnification.

5. A method as defined in claim 1, wherein the original picture, the photosensitive material and the focusing lens are held by respective holders.

6. A method as in claim 1, wherein said first and second members move with the same velocity.

7. A method as in claim 2, wherein said first and second members move with the same velocity.

8. A method as in claim 3, wherein said first and second members move with the same velocity.

9. A method as in claim 4, wherein said first and second members move with the same velocity.

10. Apparatus for automatic focusing in a projection system with continuously variable magnification over a first magnification range and second magnification range, wherein an original picture is projected onto a photosensitive material by a focusing lens, and wherein one of these three members, the original picture, the photosensitive material and the focusing lens, is fixed and the other two members are adapted to be moved in a direction of a light axis, comprising:
    (a) means for moving said two members;
    (b) detectors for detecting positions of the two members; and
    (c) control means which calculates desired positions of the two members corresponding to the desired magnification when the magnification is changed, which in said first magnification range commences motion of the first member of said two members, having a large distance to move than that of the second member of said two members, before moving the second member, and which calculates goal positions to which the second member is to be moved corresponding to the instantaneous position of the first member, and moves the second member to said goal positions dependent on the movement of the first member, the second member following substantially instantly to said goal positions including the position of the changed magnification, the picture image projected being substantially constantly focused onto the photosensitive material, and which in said second magnification range commences motion of the second member of said two members, having a larger distance to move than that of the first member of said two members, before moving the first member, and which calculates goal positions to which the first member is to be moved corresponding to the instantaneous position of the second member, and moves the first member to said goal positions dependent on the movement of the second member, the first member which follows in motion when magnification changes following substantially instantly to said goal positions including the position of the changed magnification, the picture image projected being substantially constantly focused onto the photosensitvive material.

11. A machine as defined in claim 10, wherein the original picture, the photosensitive material and the focusing lens are held by respective holders.

12. Apparatus as defined in claim 10, wherein the original picture is fixed, and wherein the control means is such that when the magnification is at least $1/\sqrt{2}$, the photosensitive material is moved prior to motion of the focusing lens and the focusing lens is moved dependent on the instantaneous position of the photsensitive material, and when the magnification is smaller than $1/\sqrt{2}$, the focusing lens is moved prior to motion of the photosensitive material, the photosensitive material being moved dependent on the instantaneous position of the focusing lens.

13. Apparatus as defined in claim 10, wherein the focusing lens is fixed, and wherein the control means controls so that, when the magnification is at least one, the photosensitive material is moved prior to motion of the original picture and the original picture is moved dependent on the instantaneous position of the photosensitive material, and when the magnification is smaller than one, the original picture is moved prior to motion of the photosensitive material, the photosensitive material being moved dependent on the instantaneous position of the original picture, the photosensitive material substantially instantaneously follows up to the goal position.

14. An apparatus as in claim 13, wherein said first and second members move with the same velocity.

15. Apparatus as defined in claim 10, wherein the photosensitive material is fixed, and wherein the control means controls, so that, when the magnification is at least $1/\sqrt{2}$, the focusing lens is moved prior to motion of the original picture and the original picture is moved dependent on the instantaneous position of the focusing lens, and when the magnification is smaller that $1/\sqrt{2}$, the original picture is moved prior to motion of the focusing lens and the focusing lens is moved dependent on the instantaneous position of the original picture, the member which follows in motion when magnification changes following substantially instantaneously to the goal position, the picture image being substantially constantly focused onto the photosensitive material.

16. An apparatus as in claim 15, wherein said first and second members move with the same velocity.

17. An apparatus as in claim 10, wherein said first and second members move with the same velocity.

* * * * *